United States Patent [19]

Lynott et al.

[11] 4,008,491
[45] Feb. 15, 1977

[54] FIXED HEAD, DIRECT ACCESS STORAGE DEVICE

[75] Inventors: John J. Lynott, Los Gatos; Elwood H. Storm, Aptos, both of Calif.

[73] Assignee: International Business Machines Corporation, Armonk, N.Y.

[22] Filed: Jan. 2, 1975

[21] Appl. No.: 538,090

[52] U.S. Cl. ............................. 360/97; 360/86
[51] Int. Cl.² .................. G11B 5/82; G11B 19/00; G11B 25/04
[58] Field of Search ................. 360/97–99, 360/86, 135; 74/436, 424.5, 571 L, 571 M, 836; 179/100.3 V, 100.4 C; 274/39 A; 346/137

[56] References Cited

UNITED STATES PATENTS

| | | | |
|---|---|---|---|
| 2,387,010 | 10/1945 | Clausen | 274/13 R |
| 2,546,821 | 3/1951 | Hansen | 360/97 |
| 2,808,268 | 10/1957 | Moore | 274/13 R |
| 3,020,358 | 2/1962 | Richardson | 360/107 |
| 3,138,669 | 6/1964 | Rabinow et al. | 179/100.4 C |
| 3,251,952 | 5/1966 | Shomer | 179/100.3 V |
| 3,361,873 | 1/1968 | Johnson et al. | 179/100.3 V |
| 3,391,247 | 7/1968 | Frohbach | 179/100.3 V |
| 3,706,857 | 12/1972 | Lynott | 360/97 |
| 3,710,357 | 1/1973 | Buslik | 360/133 |

*Primary Examiner*—Alfred H. Eddleman
*Attorney, Agent, or Firm*—Nathan N. Kallman

[57] ABSTRACT

A disk file employs a fixed magnetic head and a rotary magnetic disk that precesses about the axis of a drive motor. An escapement mechanism, that is coupled to the rotary spindle which supports the disk, is free to rotate about the motor axis, causing the disk to precess while the disk is rotating. Thus, there is relative radial movement between the precessing disk and the fixed head, enabling accessing to different data tracks.

13 Claims, 2 Drawing Figures

FIXED HEAD, DIRECT ACCESS STORAGE DEVICE

BACKGROUND OF THE INVENTION

1. Field of the Invention

This invention relates to a fixed head, direct access disk storage file.

2. Description of the Prior Art

Presently known disk files either employ a fixed head arrangement, with a stationary head for each data track, or a movable accessing head assembly wherein the magnetic head accesses different data tracks radially. In each case, the magnetic disk rotates about a fixed central axis. The fixed head arrangement requires a multiplicity of heads for a like multiplicity of tracks, which apparatus is expensive to make and maintain. In the movable head assembly, the head is conventionally mounted to an arm assembly, which parts are subject to mechanical forces that vary the position and attitude of the head relative to the disk surface. These variations cause undue modulation of the signal being recorded or read out, with resultant distortion and possible readout error.

SUMMARY OF THE INVENTION

An object of this invention is to provide a disk storage file which employs a fixed head that accesses a multiplicity of data tracks radially.

In accordance with this invention, a disk storage file includes a magnetic disk that is made to precess about a drive axis. As the result of the disk movement, a stationary head is able to access different data tracks substantially radially across the disk.

BRIEF DESCRIPTION OF THE DRAWING

The invention will be described in greater detail with reference to the drawing in which.

Similar numerals refer to similar elements throughout the drawing.

DESCRIPTION OF THE PREFERRED EMBODIMENT

Figure 1:
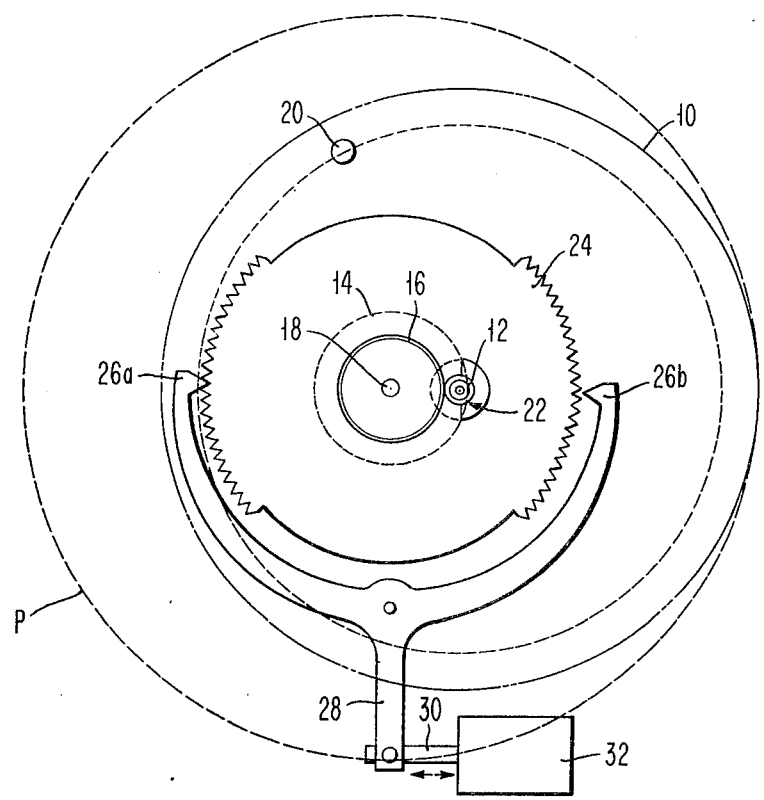
FIG. 1 is a top plan view of the magnetic disk drive, made in accordance with this invention.
Figure 2:
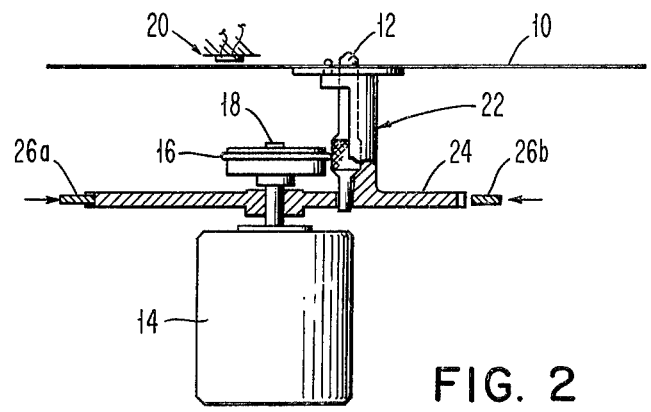
FIG. 2 is a side elevational view depicting the novel magnetic disk drive illustrated in FIG. 1.

With reference to the drawing, a disk drive includes a magnetic disk 10 that is mounted to a rotatable shaft or spindle 12. The spindle is coupled to a drive motor 14 through a rubber friction wheel 16, that is mounted to the motor drive shaft 18. The axis of the spindle 12 is displaced and not aligned with the central axis of the drive motor 14. However, the two axes are substantially parallel. During operation of the disk drive, the motor 14 continuously rotates the wheel 16, whereby the shaft 12 and the disk 10 continuously turn.

A magnetic head 20 is positioned adjacent to the disk surface in transducing relation, and is fixed relative to the frame or housing (not shown). The head mount and suspension and its electrical circuitry are not illustrated, as these elements are not considered to be part of the present invention.

In accordance with the teaching of this invention, the rotating disk 10 may be moved from one fixed position of rotation to another in a precessing path (labelled P), so that the stationary head 20 in effect is stepped from one circular data track on the rotating disk 10 to the next track. To accomplish the disk precession, the disk spindle 12 is coupled to an escapement mechanism 22 that includes a partially toothed ratchet wheel 24. The ratchet 24 is engaged at any given time with a pawl 26a or 26b. The pawls 26a, b are integral with a pivotable arm 28 that is actuated in push-pull fashion by a plunger 30 operated by a solenoid 32. The solenoid is responsive to "track advance" signals received from a control unit (not shown). As the plunger 30 is moved forward or retracted, the arm 28 pivots, thereby releasing one pawl and simultaneously engaging the other pawl with the toothed ratchet 24. This pawl action allows the disk spindle 12 and disk 10 to step along the precession path p, which is an eccentric trajectory. For each step, the stationary head 20 becomes associated with the next data track. The spacing of the teeth along the circumference of the ratchet wheel 24 determines the spacing between the data tracks registered on the magnetic disk.

When the pawls 26a, 26b are being switched out of and into engagement, there is a period of time when the ratchet wheel 24 is free to rotate. Since the ratchet wheel 24 is mounted to the drive motor shaft 18, it will rotate until the detent pawl 26a or 26b is moved into contact with the teeth of the ratchet wheel 24. The speed of action of the pivotable pawl arrangement and the plunger 32 and shaft 30 is set to allow a step or advance of the ratchet wheel to correspond preferably to one step, i.e., from one data track to the next.

The precession path P followed by the circumference of the rotating magnetic disk 10 is such that the stationary head 20 traces a helix or spiral, which traverses the disk radially. In this manner, a band of radially spaced data tracks is covered by the single stationary magnetic head.

In this manner, direct access to concentric data tracks on a disk surface may be achieved by a stationary magnetic head, with a minimum of parts and at low cost.

What is claimed is:

1. A disk drive comprising at least one stationary magnetic transducer for transducing signals between external circuitry and any of a plurality of concentric tracks on a magnetic record disk;

a rotary spindle on which such a magnetic record disk may be seated for rotation;

a drive motor having a drive shaft parallel to but offset from said spindle;

coupling means for coupling said drive shaft to rotate said spindle;

escapement means for controlling stepping of said spindle to any one of a plurality of preselected positions on a path circumscribing the axis of said drive shaft, said magnetic transducer being located outside said circumscribing path of said spindle so that, when such a disk is seated on said spindle, positioning of said spindle at different preselected positions brings different concentric tracks on the disk under said magnetic transducer.

2. A disk drive according to claim 1 wherein said escapement means comprises a spindle support member freely mounted for rotary movement about said drive shaft axis, said spindle being supported by said support member for rotation therein, said coupling means tending to cause precession of said spindle on said spindle support member about said drive shaft axis in addition to rotation of said spindle.

3. A disk drive according to claim 2 wherein said spindle support member is formed with a plurality of peripheral teeth, said escapement means further comprising a pawl means for engaging said teeth to restrain said support member against rotation and a pawl actuator means for causing alternate engagement and disengagement of said pawl means with successive teeth.

4. A disk drive according to claim 3 wherein said pawl means comprises a pair of pawl arms adjacent diametrically opposite portions of said spindle support member, said pawl arms being joined together so that one pawl arm is maintained engaged with one of said teeth while the other pawl arm is disengaged from said teeth.

5. A disk drive according to claim 4 including pivot means supporting said pawl means for reciprocable pivotal movement to bring said pawl arms alternately into and out of engagement with said teeth.

6. A disk drive according to claim 5 in which said pawl actuator means is a solenoid reciprocable between two positions to cause said reciprocable pivotal movement of said pawl means.

7. A disk drive as claimed in claim 6 in which said coupling means comprises a friction wheel, mounted on said drive shaft for rotation therewith, said friction wheel contacting said rotary spindle.

8. A disk drive for driving a magnetic record disk past a transducing head and accessing recorded information in different regions thereof, comprising:
- at least one stationary magnetic head for recording signals on and for reproducing signals from such a magnetic record disk;
- a drive motor having a continuously rotatable drive shaft;
- a spindle support means freely mounted for rotary movement concentrically with said drive shaft;
- a rotary disk support spindle, upon which such a magnetic record disk may be seated for rotation, said rotary spindle being freely mounted on said spindle support means for rotation about an axis parallel to but offset from said drive shaft axis;
- coupling means directly coupling said drive shaft to said rotary spindle so that, in operation, said spindle is continuously rotated by rotation of said drive shaft, rotation of said drive shaft also tending to cause said spindle to precess about said drive shaft upon said support means;
- and escapement means for alternately restraining said support means against said precessional movement and permitting incremental movement thereof, whereby said rotary spindle may be selectively located at different radial distances with respect to said stationary head.

9. A disk drive according to claim 8 wherein said escapement means comprises a plurality of teeth formed on said spindle support means, a pawl means for engaging said teeth to restrain said support means against rotation and a pawl actuator means for causing alternate engagement and disengagement of said pawl means with successive teeth.

10. A disk drive according to claim 9 wherein said pawl means comprises a pair of pawl arms adjacent diametrically opposite portions of said spindle support means, said pawl arms being joined together so that one pawl arm is maintained engaged with one of said teeth while the other pawl arm is disengaged from said teeth.

11. A disk drive according to claim 10 including pivot means supporting said pawl means for reciprocable pivotal movement to bring said pawl arms alternately into and out of engagement with said teeth.

12. A disk drive according to claim 11 in which said pawl actuator means is a solenoid reciprocable between two positions to cause said reciprocable pivotal movement of said pawl means.

13. A disk drive as claimed in claim 12 in which said coupling means comprises a friction wheel, mounted on said drive shaft for rotation therewith, said friction wheel contacting said rotary spindle.

* * * * *